July 15, 1958  J. J. BLACK  2,843,422
SHIFTABLE ROOF STRUCTURE FOR OPEN TOP VEHICLES
Filed March 30, 1956  4 Sheets-Sheet 1
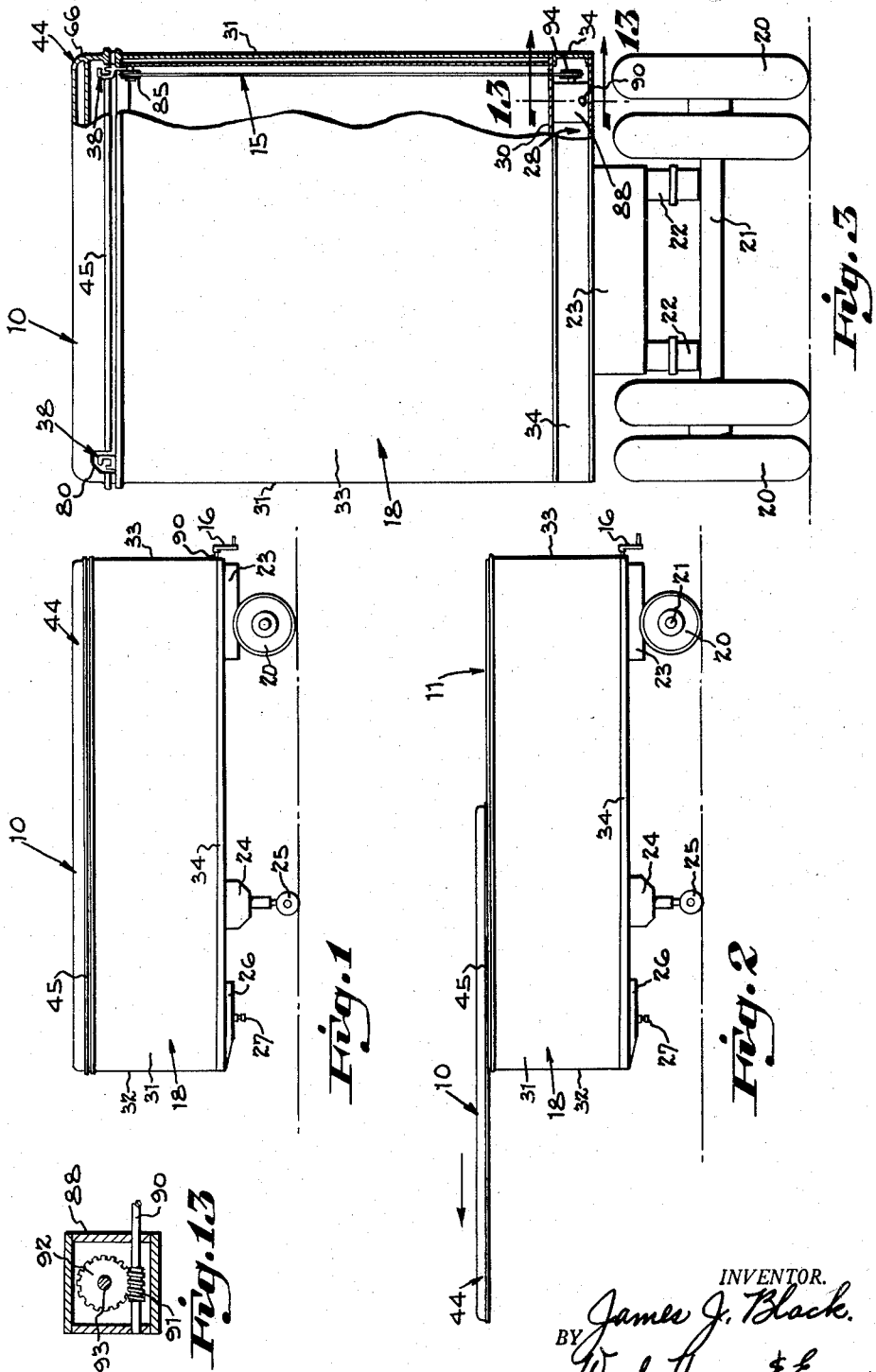
INVENTOR.
James J. Black.
BY Wood, Herron & Evans,
ATTORNEYS.

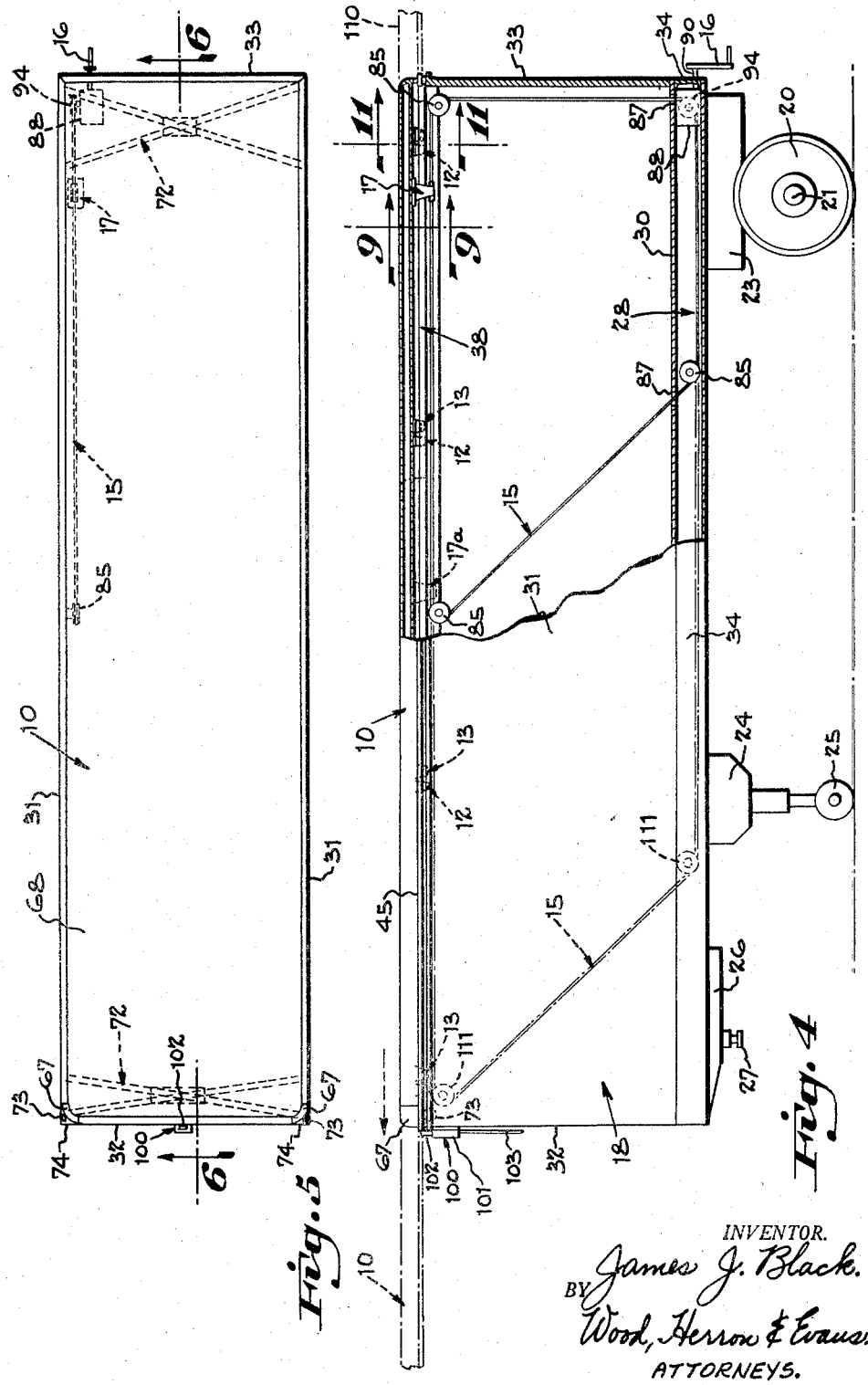

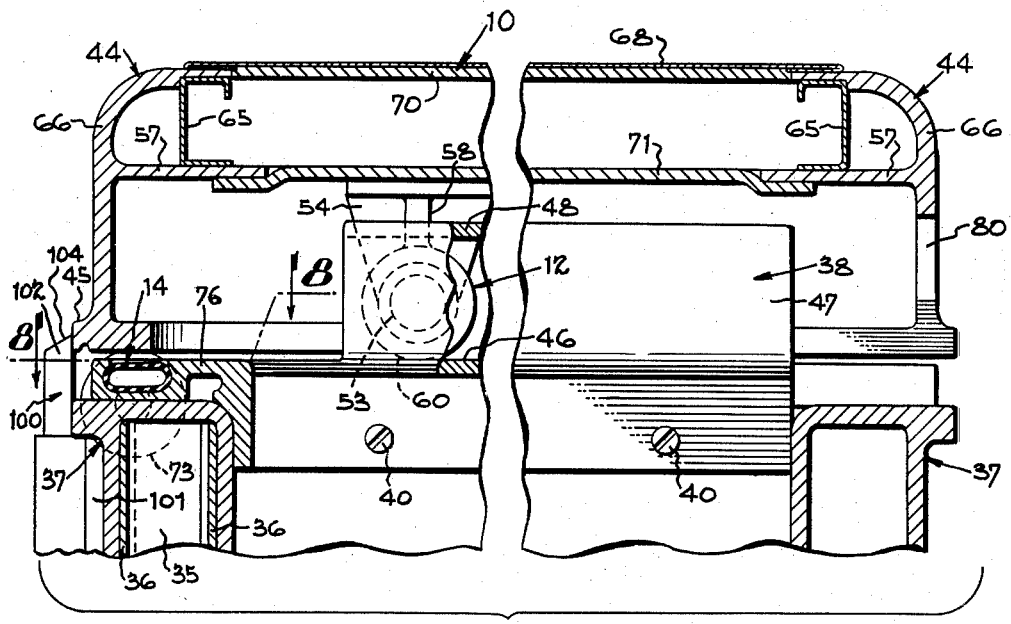
Fig. 6
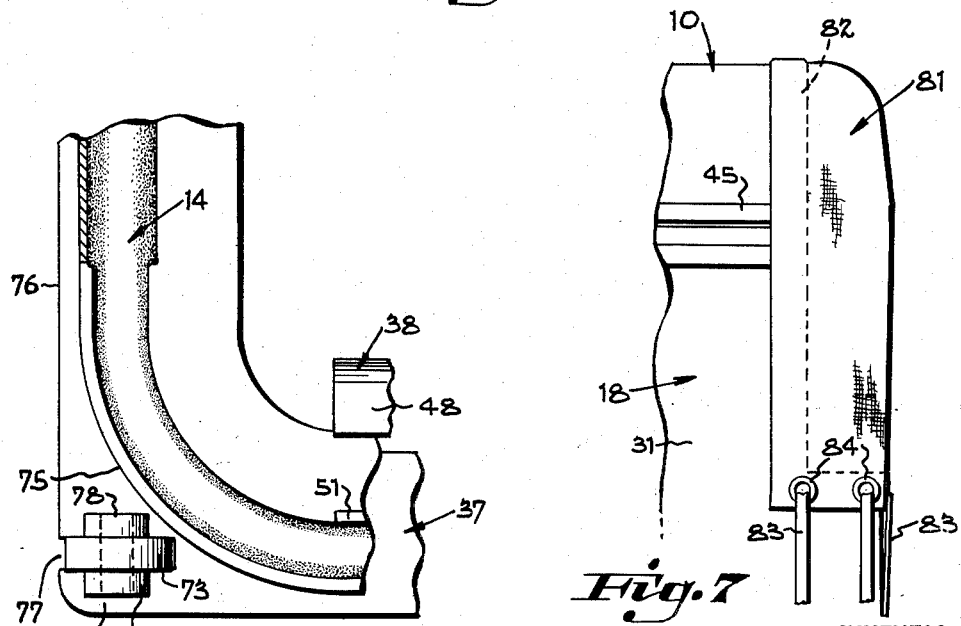
Fig. 8
Fig. 7
INVENTOR.
James J. Black.
BY
Wood, Herron & Evans.
ATTORNEYS.

July 15, 1958  J. J. BLACK  2,843,422
SHIFTABLE ROOF STRUCTURE FOR OPEN TOP VEHICLES
Filed March 30, 1956  4 Sheets-Sheet 4
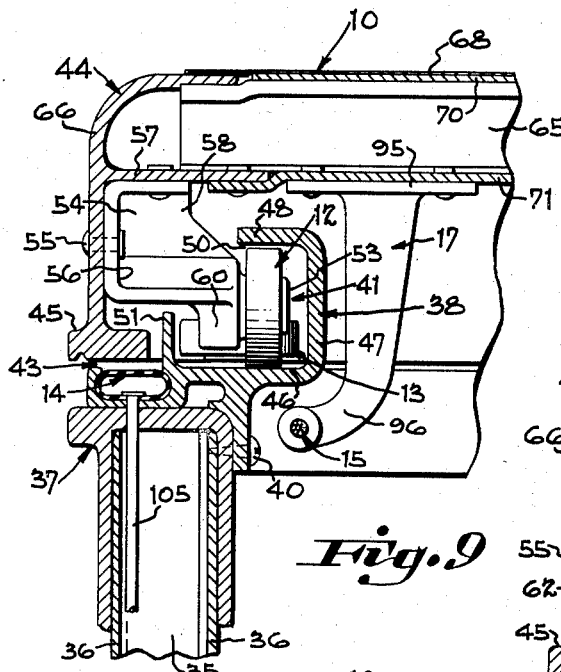
Fig. 9
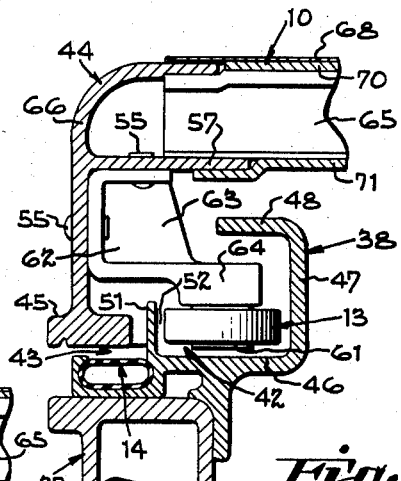
Fig. 11
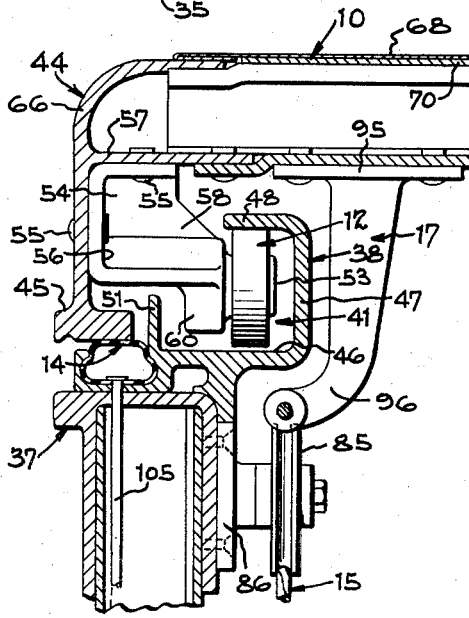
Fig. 10
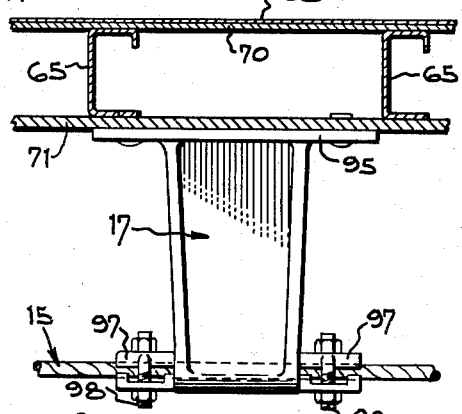
Fig. 12
INVENTOR.
James J. Black.
BY Wood, Herron & Evans,
ATTORNEYS.
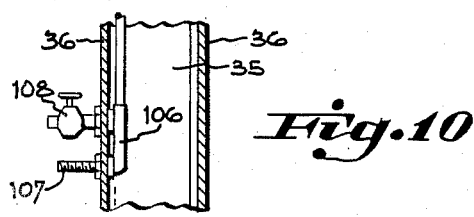

United States Patent Office 2,843,422
Patented July 15, 1958

2,843,422

SHIFTABLE ROOF STRUCTURE FOR OPEN TOP VEHICLES

James J. Black, Cincinnati, Ohio, assignor to Trailmobile Inc., Cincinnati, Ohio, a corporation of Delaware Application March 30, 1956, Serial No. 575,181

12 Claims. (Cl. 296—137)

This invention is directed to a shiftable, metallic roof unit for open top trailers and trucks which are used in the highway transportation of freight. The open top vehicle is of particular utility in the handling of heavy and bulky objects since it allows the cargo to be loaded and unloaded from above with an overhead crane or a similar piece of equipment.

The conventional open top vehicle usually is provided with a removable tarpaulin cover which is placed across the open top and attached to the body to protect the cargo from the weather during transport. The vehicle may also include detachable roof bows spanning the side walls and having opposite ends clamped to the top of the walls. The roof bows are used to prevent the side walls from spreading apart and to control lateral deflection under the forces imposed during transport. The roof bows also support the tarpaulin cover above the cargo.

To load or unload the cargo, the roof bows must be demounted and the tarpaulin cover removed or at least turned back from a portion of the body; consequently, loading and unloading involves a considerable amount of time and labor. Moreover, the tarpaulin cover requires repair and replacement from time to time, and in general, is a rather unsatisfactory makeshift arrangement.

One of the primary objects of the invention has been to provide an open top vehicle having a rigid, metallic roof structure which is conveniently shifted lineally as a unit to an open or closed position, thereby overcoming the disadvantages associated with open top vehicles of conventional construction.

A more specific objective has been to provide an anti-friction roller and track construction supporting the roof for rolling motion, combined with an expansible tube which seals the roof and exerts sufficient upward pressure to lift the weight load of the roof off the rollers when expanded. By taking advantage of the sealing tube to lift the roof and hold it by friction in closed position, the trackways are protected against the localized wearing or forging action of the rollers during transport. In other words, since the shiftable roof normally is carried upon anti-friction rollers, forces acting upon the roof during road transport normally tend to shift the roof lineally to some extent upon its tracking rails. This sustained relative motion, even if relatively slight, would cause the rollers eventually to wear or forge localized depressions in the tracking surface, thus interfering seriously with the smooth, easy action of the rollers as the roof is shifted.

According to the present concept, the forging effect is completely eliminated as an incident of expanding the tube; moreover, the expansible tube engages the sealing interface of the roof structure under relatively high pressure and thereby creates a highly efficient sealing action.

A further advantage of the expansible seal arises from the fact that it is capable of sealing and unsealing the roof structure very rapidly from a point remote from the roof, using fluid pressure as the expanding medium. For convenience, the supply line of the tube preferably includes a standard tire valve located at a convenient point along the vehicle so that the tube may be inflated to expanded condition from the standard automotive air nozzle which is usually available at or near the loading area. The supply line to the tube further includes a hand operated relief valve which is opened to deflate and contract the tube, thereby to transfer its weight to the load bearing rollers when it is to be rolled to open position.

In general, a structure for carrying out the concept of this invention may comprise a rolling roof of rigid, one-piece construction, having load bearing rollers along opposite sides tracked within channel-shaped load bearing rails mounted along the top of the body walls. The rails further include the expansible seal in the form of a continuous tube of rubber or equivalent material extending with the rails along the side walls and across at least one end wall of the body.

In the form illustrated, the roof structure includes a foot flange overhanging the expansible tube and spaced a slight distance above it on opposite sides. Upon being inflated, the expanding tube engages the overhanging roof flange under sufficient pressure to lift the roof structure bodily, the fluid pressure naturally being equalized on opposite sides of the structure, by the continuous tube. The upward lift of the roof is limited by the channel-shaped rails which confine the load bearing rollers, the rails being slightly wider than the diameter of rollers to provide a slight amount of running clearance. When expanded under pressure, the sealing tube takes up the clearance and holds the rollers against the upper surfaces of the channels while frictionally engaging the roof flange to hold the roof against lineal motion.

The arrangement of the trackways, rollers and expansible tube has the further advantage of imparting increased strength and rigidity to the vehicle body when the roof is closed and sealed under air pressure. In other words, the upward force imposed by the sealing tube against the roof structure creates a clamping effect between the walls and roof which ties the structure together and resists relative vibration between the wall and roof structure during road transport.

Normally, with the seal deflated, the roof and side walls are mechanically tied together by means of guide rollers which are confined within channel-shaped guide rails parallel with the load bearing rails. In the preferred structure, the load bearing rail and guide rail are incorporated in a single extrusion which further includes an open groove confining the expansible sealing tube.

The roof may be shifted selectively to closed or open position either by power or manually. In the structure illustrated, a cable loop is carried upon idler sheaves at one side of the body and is connected to the roof by a cable bracket. The cable loop passes around the winding sheave of a winch mounted at the rearward end of the body and operated by a hand crank. The winch preferably has a self-locking worm and worm wheel drive, so as to hold the roof in a selected open position even though the vehicle may be parked on a slope. As a safety measure, the roof preferably includes a latching device to hold it in closed position independently of the expanded sealing tube.

The several features and advantages of the invention are brought out in detail in the following description taken in conjunction with the attached drawings.

In the drawings:

Figure 1 is a diagrammatic side view of a semi-trailer equipped with the rolling roof mechanism of this invention.

Figure 2 is similar to Figure 1, showing the roof shifted to its open position for loading or unloading.

Figure 3 is an enlarged diagrammatic view looking toward the rearward end of the trailer.

Figure 4 is an enlarged side elevation, similar to Figure 1, with the side wall broken away to illustrate the general arrangement of the roof actuating mechanism.

Figure 5 is a top plan view projected from Figure 4, further illustrating the general arrangement.

Figure 6 is an enlarged fragmentary sectional view of the roof structure, taken longitudinally as indicated by 6—6 of Figure 5.

Figure 7 is a fragmentary view of the rearward portion of the trailer body showing a tarpaulin cover for weather sealing the rearward end of the shiftable roof.

Figure 8 is a fragmentary plan view of the guide rail and inflatable sealing tube, taken along line 8—8 of Figure 6.

Figure 9 is an enlarged sectional view of the tracking mechanism and sealing tube, with the tube deflated for shifting the roof, the section being taken along line 9—9 of Figure 4.

Figure 10 is a view similar to Figure 9, showing the position of the parts when the sealing tube is inflated.

Figure 11 is a fragmentary sectional view similar to Figure 9, showing the lateral guide mechanism, the view being taken along line 11—11 of Figure 4.

Figure 12 is a fragmentary side view showing the bracket which connects the actuating cable to the rolling roof.

Figure 13 is a diagrammatic sectional view taken along line 13—13 of Figure 3, showing the driving unit for the roof structure.

General arrangement

The typical semi-trailer shown in the drawings has been selected to illustrate the principles of the rolling roof structure, although it will be understood that the roof mechanism is intended for open top vehicles in general. Since the exact construction of the vehicle is immaterial to the invention, the semi-trailer is shown somewhat in diagrammatic form in the drawings.

Referring to Figures 1–5, the shiftable roof is indicated generally at 10 and, in the present disclosure, it is arranged to be rolled forwardly to an open position overhanging the tractor, leaving the rearward portion of the trailer body open for loading or unloading, as indicated at 11. As shown, the roof unit normally covers the entire length of the vehicle, and in open position, exposes approximately one-half the body for overhead loading and unloading. The structure is intended primarily for transporting bulky or heavy pieces of freight, such as large boxes and crates which can best be loaded and unloaded with an overhead crane or the like.

As described later in detail, the rolling roof 10 is supported for lineal motion upon load bearing rollers indicated generally at 12 and is guided laterally by the guide rollers 13. The load bearing and guide rollers are arranged in sets lengthwise of the roof along opposite sides as shown in Figures 4, 9 and 11. The expansible sealing tube, indicated generally at 14, is shown in its active and inactive condition in Figures 9 and 10, the load bearing rollers being unloaded by the inflated tube when the roof is closed and sealed.

According to the present disclosure (Figures 4 and 5), the roof is shifted longitudinally (with the tube deflated) by a cable loop 15 connected to the roof and actuated by a hand operated crank 16 located at the curb side of the vehicle. The cable is connected to the roof by the bracket 17 which assumes the position shown in full lines when the roof is closed, and shifts to the position shown in broken lines as at 17a when the roof is shifted to open position.

In the modified arrangement indicated in broken lines in Figure 4, the cable loop may be arranged to shift the roof in both directions so as to expose both end portions of the body. In this event, the cable bracket 17 is located at a mid-point along the length of the roof, approximating the position 17a so as to provide the required travel in both directions.

The trailer body 18 includes road wheels 20 journalled on a rear axle 21 connected by springs 22 to an undercarriage 23. When uncoupled as shown, the forward end of the body is supported upon a landing gear or prop 24 having wheels 25 which rest upon the ground. When the trailer is coupled to a tractor, the landing gear is retracted or elevated to a position above the roadway in the usual manner. The trailer further includes a fifth wheel 26 located forwardly of the landing gear and including a king pin 27. The fifth wheel mates with the fifth wheel of the tractor in the usual way when the tractor is backed into coupling position beneath the trailer fifth wheel. The tractor fifth wheel includes coupling jaws, which establish a draft connection with the trailer king pin 27 when in coupled position.

A best shown in Figures 3 and 4, the trailer body includes a frame structure indicated generally at 28 which includes the usual transverse and longitudinal framing members supporting a floor 30. For simplicity, the structural members have been omitted; however, it will be understood that the undercarriage 23, prop 24, and fifth wheel 26 are attached to the framing structure in the usual way.

The trailer body consists of vertical side walls 31—31, a forward end wall 32 and a rearward end wall 33. As shown in Figure 3, the floor structure overhangs the rear wheels and includes a longitudinal channel 34 at opposite sides supporting the side walls 31. The front and rear walls 32 and 33 preferably are supported in a similar way upon transverse channels 34 (Figure 4). Since the freight is loaded from above, the rear doors, normally used in loading and unloading have been omitted; however, the body preferably is provided with one or more smaller doors (not shown) to permit the operator to enter the body if necessary.

The side walls of the body preferably consists of spaced vertical load bearing studs 35 enclosed by inner and outer panels 36, the studs or posts being attached in the usual way to the under-frame 28 to resist lateral deflection. The forward and rearward walls are similar in construction to the side walls. The upper portion of the side and end walls include a respective cap section 37, generally U-shaped in cross section, resting upon the wall studs and overlying the wall panels. The cap sections are secured to the studs by screws or the like (not shown).

Sliding roof details

As detailed in Figures 9 to 11, the sliding roof is carried upon the tracking rails indicated generally at 38 which are seated upon the top of cap sections 37 at opposite sides and secured by the screws 40. Each tracking rail comprises a one-piece extrusion formed of aluminum or alloy providing a load bearing channel 41 confining the load bearing rollers 12 which rotate in a vertical plane. A second channel 42 confines the guide rollers 13 which rotate in the horizontal plane. The tracking rails further include an open longitudinal groove indicated at 43 confining the sealing tube 14, which may be cemented in place. The tube extends for the full length of the side walls and preferably extends continuously across the front wall as shown in Figure 8. The load bearing channel and guide channel likewise extend for the full length of the side walls and, in modified form across the forward end wall as shown in Figure 6. It will be noted in Figures 6 and 9, that the roof side rails or quarter panels 44 each include a foot flange 45 which overhangs the sealing tube along the side walls and front wall in a position to be engaged by the tube when it is inflated.

Described in detail (Figure 9), each load bearing channel 41 has a load bearing surface 46 upon which the load bearing rollers 12 track, the load bearing channels being delineated by the vertical web 47 and top flange 48. The load bearing channel has a width slightly greater than the diameter of the load bearing rollers 12 to provide a running clearance indicated at 50 between the top flange and roller.

The guide channel 42 for the guide rollers 13 (Figure 11), is delineated by the vertical flange 51 spaced outwardly from the web 47 of the load bearing channel 41. The guide rollers 13 are carried in a plane slightly above the load bearing surface 46 and the width of the guide channel 42 is greater than the diameter of the guide rollers to provide running clearance indicated at 52. This clearance accommodates the slight lineal deviations along the walls which may otherwise lead to a binding effect as the guide rollers are advanced along their channels.

Each load bearing roller 12 is rotatably mounted upon a stud 53 projecting from the bearing bracket 54 which is riveted at at 55 to the curved quarter panel 44 of the roof structure at opposite sides (Figure 9). The bracket includes a generally right angular flange 56 which interfits the side and horizontal flange 57 of the roof quarter panel. The bracket is reinforced by a rib 58 extending from the right angular flange to the boss 60 which supports the stud.

Each guide roller 13 (Figure 11) is rotatably journalled upon a stud 61 projecting downwardly from a bracket 62 generally similar to the load bearing bracket. Bracket 62 includes a reinforcing rib 63 extending from its right angular flange to the boss 64 which carries the stud. These brackets interfit the quarter panel 44 and are riveted to it as at 55.

The roof 10 is of rigid construction comprising the curved quarter panels or side rails 44 which form a marginal frame joined by a series of roof bows 65 secured to the intermediate flange 57 of the quarter panel at opposite sides (Figures 9 and 12). The forward and rearward ends of the roof include a similar quarter panel forming head rail 66—66 as best shown in Figure 6. The rearward rail 66 may be joined to the side rails by a mitre joint, as indicated in Figure 5, while the front head rail may be joined by curved sections 67. A roof sheet 68 marginally overlies the inner edge portion of each quarter panel and is secured by screws or the like (not shown). A layer of insulating material 70 such as plywood, is interposed between the roof bows and roof sheet and a ceiling panel 71 is mounted below the roof bows and may be secured by screws (not shown). As indicated in broken lines in Figure 5, the roof structure is braced by the trusses indicated generally at 72—72, each consisting of a pair of cross braces crossing one another and having opposite ends attached to the side quarter panels.

The roof construction, in general, follows that used on the standard closed top trailer bodies; the intermediate flange 57 of the quarter panels, combined with the truss work at the opposite end, imparts additional stiffness. As viewed longitudinally in Figure 2, the structure is sufficiently rigid to be self-sustaining in cantilever fashion when shifted to its open position.

In extended position, the major weight load of the roof is carried upon a set of fulcrum rollers 73 at the forward end of the body (Figure 4). Forces tending to tilt or over-balance the roof are resisted by the load bearing rollers 12 of its unextended portion which will bear against the top flange 48 of the load bearing channels.

As indicated in Figures 4, 5, and 8, the fulcrum rollers 73 are rotatably journalled in an overhanging flange portion 74 at the front corners which project forwardly from the curved corners 75 of the tracking rail 38. The flange may be slotted as at 77 to clear the rollers, the rollers being carried upon studs mounted in brackets 78 at opposite sides. The rollers are located in alignment with the expansible tubes in a position to track upon the overhanging foot flange 45 of the quarter panel, the rollers being located outwardly of the load bearing rollers 12.

The supplemental rollers relieve the load bearing rollers of the weight load imposed of the overhanging portion of the roof.

As indicated in Figures 6 and 8, the curved forward corners 75 of the tracking rail 38 correspond with the curved corner sections 67 of the quarter panel. The sealing tube 14 extends continuously around the curved corners and across the front rail 76 to the opposite side wall. Accordingly, the tube imposes an equalized pressure upon the foot flange 45 along both sides and across the front of the roof.

As shown in Figures 6 and 8, the front cross rail 76 is similar in cross section to the tracking rail 38 of the side walls, the load bearing channel 41 and vertical flange 51 having been removed to allow the forward head rail to pass across the front rail.

According to the present structure, the rearward head rail 66 is provided with notches 80—80 on opposite sides (Figures 3 and 6) to provide clearance for the tracking rails 38 as the roof is shifted forwardly. To close off the rearward end portion against the weather, a closure cap 81 formed of tarpaulin is applied over the rearward portion of the roof and body overlying the notched head rail 66 (Figure 7). The cap includes a marginal sealing strip 82 of foam rubber or the like, which seats against the body and roof. The cap is attached by means of straps 83 passing through eyelets 84, the straps being secured to fastening devices attached to the body in the usual way. The cap section is removed when the roof is to be opened and is replaced when the roof is closed.

The cable loop 15 shown in Figures 4 and 5 may consist of a wire cable trained over idler sheaves 85 suitably grooved for the cable. As shown in Figure 10, each sheave is journalled upon a bracket 86 which is secured by screws to the cap section 37 with the upper sheaves located beneath the load bearing channel 41. The lower sheave 85 is mounted below the floor 30 upon a similar bracket 86 which is attached to the frame 28, the cable passing through openings 87 formed in the floor.

A winch 88 is mounted beneath the floor at the rearward end of the body, the hand crank 16 being attached to a winch shaft 90 extending outwardly through the frame channel 34 as indicated in Figures 3 and 4. As shown diagrammatically in Figure 13, shaft 90 includes a worm 91 meshing with a worm wheel 92 within the winch housing. The worm wheel is keyed to a cross shaft 93 journalled in the winch housing, the cable driving sheave 94 being attached to the cross shaft. This arrangement provides a self-locking drive which holds the shiftable roof in a selected open position even though the vehicle may be parked on a sloping grade. The anti-friction support provided by the load bearing rollers and the reduction ratio provided by the worm and wheel drive allows the roof to be shifted without a great deal of manual effort.

As shown in Figure 12, the cable bracket 17 includes a mounting flange 95 at its upper end which is attached by rivets to the roof panel. The bracket includes an outwardly curved lower end portion 96, the cable passing through a bore formed therein. The cable is anchored to the bracket by the cable clips 97 anchored upon the cable and engaging the bracket at opposite sides. Each cable clip comprises a pair of clamping plates seated against opposite sides of the cable, each plate having a stud 98 at one end passing through a matching hole in the companion plate and clamped by a nut. Since the roof assembly is guided laterally by the guide rollers 13, it shifts without binding, even though the actuating cable is located at one side only.

It will be understood that the cable drive is intended to illustrate one form of structure suitable for shifting the roof. For example, a chain and sprocket drive, following the same general principle, may be substituted for the cable, or a rack may be attached to the roof and driven by a suitable pinion from a source of power such as the worm and wheel drive illustrated.

As a safety measure, a latch, indicated generally at 100 (Figures 4 and 6,) is mounted on the body to lock the shiftable roof in its closed position independently of the sealing tube. The latch, shown diagrammatically, comprises a bracket 101 attached to the cap section of the front wall, having a slidable plunger 102 normally urged upwardly by spring means to a latching position engaging the foot flange 45 of the roof. The latch includes an actuating cable or rod 103 extending downwardly to a hand operated release means (not shown) for shifting the plunger downwardly. The latch necessarily is shifted to a release position before the roof can be rolled forwardly to its open position. The upper end of the plunger preferably is chamfered as at 104 to allow it to snap automatically to its latching position by a camming engagement with the edge of flange 45 when the roof is shifted back to closed position.

Referring to Figure 10, a conduit 105 is indicated diagrammatically for expanding and contracting the sealing tube 14 by air pressure. As shown, the conduit extends downwardly between the wall panels to the lower portion of the body and its lower end includes a fitting 106 for supplying and relieving the air pressure. In the arrangement shown, a standard automotive tire valve 107 is connected to the fitting and extends through the panel to the exterior of the body. A hand operated relief valve 108 likewise is connected to the fitting and located at the exterior of the body. The tire valve 107 includes the usual valve stem and allows the tube to be inflated by using the standard automotive air pressure nozzle which is normally used for tires. An air pressure in the neighborhood 30 to 40 pounds p. s. i. is sufficient to elevate the roof and clamp it in closed position.

As indicated in broken lines at 110 in Figure 4, the roof may be arranged to roll in both directions so as to expose both ends of the body for loading and unloading. In this event, the forward sheaves 85 may be located at the forward end of the body as indicated at 111 in broken lines, and the cable loop is extended as indicated. To provide the necessary movement, the cable bracket 17 is relocated to a position near the mid-point of the body, approximately at the location previously indicated in broken lines at 17a. Accordingly, when the roof is shifted forwardly, the bracket will advance from the midpoint toward the forward end of the body and when shifted in the opposite direction, the bracket will advance toward the rearward end of the body.

It will be apparent from the foregoing, that the roof is capable of being opened quickly and conveniently at the loading dock simply by opening relief valve 108 to contract the seal and releasing the latch 100 to allow the roof to be shifted. Since the air valves are located near the floor lever adjacent the hand crank 16, control of the roof position is centralized and precise. When the roof is to be sealed, the relief valve 108 is closed and air pressure is applied to the tire valve 107 in the usual way. The expansible seal provides a highly reliable weather seal and by its function of lifting the roof from the load bearing rollers, the tube preserves the tracking structure against wear. It will be noted in Figure 10, that when inflated, the tube presses the load bearing rollers 12 upwardly against the top flange 48 of the channel to control upward motion of the roof and impart additional stiffness to the structure by the clamping action noted earlier.

It will be understood that with the seal deflated, the roof and side walls are mechanically tied together by the guide rollers 13 which are confined laterally within their channel-shaped rails at opposite sides (Figure 11). The guide rollers thus prevent spreading of the side walls whether the roof is sealed or unsealed, although the running clearance of the guide rollers provides a rather loose connection for smooth, easy operation. On the other hand, when the tube is inflated it locks the parts under sufficient pressure to prevent relative vibration and noise while in transit. The expansible tube thus coacts with the load bearing surfaces and also with the lateral giude surfaces of the roof structure.

Having described my invention, I claim:

1. A shiftable roof structure for a vehicle body having an open top, said shiftable roof structure comprising, a roof unit extending across the open top of the body and movable lineally relative to the open top to an open or closed position, restraining means connecting the roof unit to the vehicle body and limiting upward motion of the lineally movable roof unit relative to the body, an expansible seal disposed between the body and roof unit at opposite sides, and means connected to said expansible seal for selectively contracting and expanding the same, said expansible seal supporting the weight load of the roof unit at an upward limit provided by said restraining means, the expansible seal providing a weather seal between the body and roof unit upon being expanded.

2. A shiftable roof structure for a vehicle body having an open top, said shiftable roof structure comprising, a roof unit extending across the open top of the body, load bearing elements disposed between the body and roof unit along opposite sides of the said open top, said load bearing elements normally carrying the roof unit for lineal movement to an open or closed position relative to the open top, restraining means interconnecting the lineally movable roof unit and vehicle body limiting upward motion of the roof unit relative to the body, said body and roof unit having opposed sealing surfaces along opposite sides of the open top, expansible sealing means disposed between said oposed sealing surfaces of the body and roof unit at opposite sides, and means connected to said expansible sealing means for selectively contracting and expanding the same, said expansible sealing means forcing said opposed sealing surfaces apart from one another and lifting the roof unit relative to the body and transferring the weight load of the roof unit at least partially from said load bearing elements upon being expanded, the sealing means thereby holding the roof in closed position by pressure engagement of the expanded sealing means with the opposed sealing surfaces of said body and roof unit and providing a weather seal between the opposed sealing surfaces of the body and roof unit.

3. A shiftable roof structure for a vehicle body having an open top, said roof structure comprising, a roof unit extending across the open top of the vehicle body, a pair of load bearing rails extending longitudinally along said open top on opposite sides of the vehicle body, a plurality of load bearing rollers journalled upon the roof unit at opposite sides, said rollers tracking upon said load bearing rails and supporting the roof unit for lineal movement to an open or closed position relative to the open top, restraining means interconnecting the roof unit and vehicle body and limiting upward motion of the lineally movable roof unit relative to said tracking rails, expansible sealing means interposed between the roof unit and tracking rails on opposite sides of the body, and means connected to said expansible sealing means for contracting and expanding the same, said expansible sealing means at least partially lifting the weight load of the roof unit from said load bearing rollers when in expanded condition with the roof unit in closed position, said expansible sealing element thereby establishing a weather seal between the bearing rails and roof unit along opposite sides of the said open top.

4. A shiftable roof structure for a vehicle body having an open top, said shiftable roof structure comprising, a roof unit disposed above the open top of the body, generally horizontal load bearing surfaces on the body extending lineally beneath the roof unit on opposite sides of the open top and supporting the roof unit for lineal motion relative to the body, guide surfaces interposed between the body and roof unit and guiding the roof unit laterally during lineal movement thereof restraining means relatively interconnecting the lineally movable roof unit and vehicle body and limiting upward motion of the roof unit relative to the body, expansible sealing means disposed between the body and roof unit along opposite sides of the open top, and means connected to said expansible sealing means for selectively contracting and expanding the same, said expansible sealing means providing a weather seal between the body and roof unit and frictionally holding the roof unit in closed position when expanded.

5. A shiftable roof structure for a vehicle body having an open top, said roof structure comprising, a roof disposed over the open top of the body, a pair of longitudinal load bearing rails mounted along the upper portion of said body on opposite sides of the open top, a plurality of load bearing rollers journalled upon the roof at opposite sides and tracked upon said load bearing rails, said load bearing rails having surfaces overhanging said rollers and limiting upward movement thereof, means connected to the roof for shifting the same lineally to an open or closed position relative to the open top, expansible sealing means interposed between the body and roof at opposite sides of the open top, and means connected to said expansible sealing means for contracting and expanding the same, said expansible sealing means lifting the weight load of the roof from said load bearing rollers and forcing the rollers against the overhanging surfaces of the load bearing rails when the sealing means are expanded, thereby establishing a weather seal between the roof and body along opposite sides of the open top when the roof is closed and the sealing means are expanded.

6. A shiftable roof structure for a vehicle body having an open top, said roof structure comprising, a roof disposed over the open top of the body, longitudinal load bearing rails mounted along the upper portion of said body on opposite sides of the open top, a plurality of load bearing rollers journalled upon the roof along opposite sides and tracked upon said load bearing rails, the rollers normally carrying the roof for lineal motion to an open or closed position, said load bearing rails having surfaces overhanging said rollers and limiting upward movement thereof, expansible sealing tubes interposed between the surfaces of the rails and roof at opposite sides of the open top, a fluid pressure conduit connected in common to the sealing tubes at opposite sides of the open top for supplying fluid pressure to the tubes and relieving the same, thereby expanding and contracting the tubes under equalized pressure, said sealing tubes lifting the roof from said load bearing rollers and forcing the rollers upwardly against the overhanging surfaces of the load bearing rails, thereby providing an equalized pressure seal between the surfaces of the rails and roof along opposite sides of the open top when the roof is closed and the sealing tubes are expanded.

7. A shiftable roof structure for a vehicle body having an end wall, a pair of side walls, and an open top, said roof structure comprising, a roof disposed over the open top of the body, longitudinal load bearing rails mounted along the upper portion of said side walls on opposite sides of the open top, a plurality of load bearing rollers journalled upon the roof along opposite sides and tracked upon said load bearing rails, the rollers normally carrying the roof for lineal motion to an open or closed position, said load bearing rails having surfaces overhanging said rollers and limiting upward movement thereof, an expansible sealing tube interposed between the surfaces of said rails and roof at opposite sides of the top, said tube extending along the side walls and across the end wall of the body, a fluid pressure conduit connected to the sealing tube for supplying fluid pressure to the tube and relieving the same, thereby expanding and contracting the tube under equalized pressure along the side walls and end wall, said sealing tube lifting the weight load of the roof from said load bearing rollers and forcing the rollers against the overhanging surfaces of the load bearing rails, thereby proving an equalized pressure seal between the surfaces of the rails and roof along opposite sides of the open top when the roof is closed and the sealing tube is expanded.

8. A shiftable roof structure for a vehicle body having an end wall, a pair of side walls, and an open top, said shiftable roof structure comprising a pair of channel-shaped tracking rails mounted upon the upper portion of the side walls at opposite sides of the open top, a shiftable roof disposed across the open top of the vehicle body, said roof having a series of load bearing rollers journalled along opposite sides thereof and tracked within said channel-shaped rails, said load bearing rollers being free to track longitudinally therein, thereby supporting the roof for lineal motion to an open or closed position relative to the open top, said channel-shaped rails each having a surface overhanging said load bearing rollers and limiting upward movement of said rollers and shiftable roof relative to the channel-shaped rails, a series of lateral guide rollers rotatably journalled on the roof along opposite sides thereof, guide means engaging the guide rollers and confining the guide rollers and roof for lineal movement, an inflatable sealing tube interposed between the roof and body, said tube extending along said side walls and across the end wall of the body, and means for supplying fluid pressure to said tube, said tube lifting the weight load of the roof from said load bearing rollers upon being inflated, said tube thereby holding the roof in closed position and establishing an equalized pressure seal along opposite sides of the open top.

9. A shiftable roof structure for a vehicle body having a pair of side walls and an open top, said shiftable roof structure comprising, tracking rails mounted upon the upper portion of the side walls along opposite sides of the open top, a shiftable roof residing across the top of the side walls and having load bearing rollers journalled along opposite sides thereof and rotatable in a vertical plane, said tracking rails each having a channel-shaped load bearing rail comprising a vertical flange and spaced upper and lower flanges, said load bearing rollers being tracked upon the said lower flanges and supporting the roof for motion along a lineal path to an open or closed position relative to the open top, guide rollers journalled on the roof along opposite sides and rotatable in a horizontal plane, each of said tracking rails having a vertical guide flange adjacent the guide rollers loosely confining the guide rollers and roof laterally along said lineal path of motion, sealing tubes interposed between the surfaces of the tracking rails and roof along opposite sides of the open top, and conduit means connected in common to said tubes for supplying fluid pressure to the tubes and relieving the same, thereby expanding and contracting said tubes, said tubes lifting the weight load of the roof from said load bearing rollers and forcing said rollers against the upper flanges of said channel-shaped load bearing rails when said tubes are expanded under fluid pressure with the roof closed, the expanded tubes thereby holding the roof in closed position under equalized pressure along opposite sides and clamping the roof against relative lateral motion relative to the load bearing rails and guide flanges, said tubes establishing a weather seal between the surfaces of the rails and roof along opposite sides of the open top.

10. A shiftable roof structure for a vehicle body having an open top, said roof structure comprising, a roof disposed over the open top of the body, a pair of longitudinal load bearing rails mounted along the upper portion of said body on opposite sides of the open top, load bearing rollers journalled upon the roof along opposite sides and tracked upon said load bearing rails, restraining means interconnecting the roof and vehicle body and limiting upward motion of the roof relative to the body, a driving unit in driving connection with the roof for shifting the roof lineally to an open or closed position relative to the open top, manual control means connected to the driving unit and located at a lower portion of the vehicle body, an expansible sealing tube interposed between the surfaces of the load bearing rails and roof along opposite sides of the open top, and a conduit connected to said expansible tube and including manual control means located at the lower portion of the body for supplying fluid pressure to said expansible tube and for relieving the same, thereby to expand and contract the tube, the tube upon being expanded, lifting the weight load of the roof from the load bearing rollers to preserve the load bearing rails when the roof is closed, the said expanded tube establishing a weather seal between the surface of the load bearing rails and roof along opposite sides of the open top.

11. A shiftable roof structure for a vehicle body having an open top, said roof structure comprising, a roof disposed over the open top of the body, a pair of longitudinal load bearing rails mounted along the upper portion of said body on opposite sides of the open top, a plurality of load bearing rollers journalled upon the roof along opposite sides and tracked upon said load bearing rails, said rollers normally supporting the roof for lineal motion, restraining means interconnecting the roof and vehicle body and limiting upward motion of said load bearing rollers and roof relative to said load bearing rails, a driving unit in driving connection with the roof, manual control means connected to the driving unit for actuating the driving unit in forward and reverse directions, thereby to shift the roof lineally to an open or closed position relative to the open top of the body, means in the driving unit providing a self-locking action between the driving unit and roof when the manual control means of the driving unit is deactivated, thereby to hold the roof in a selected lineal position, an expansible sealing tube interposed between the surfaces of the load bearing rails and roof along opposite sides of the open top, and a conduit connected to said expansible tube for supplying fluid pressure to said expansible tube and for relieving the same, thereby to expand and contract the tube, said sealing tube, upon being expanded lifting the weight load of the roof from the load bearing rollers and creating a weather seal between the surfaces of the load bearing rails and roof along opposite sides of the open top when the roof is in closed position.

12. A shiftable roof structure for a vehicle body having an open top, said shiftable roof structure comprising, a pair of channel-shaped tracking rails mounted upon the upper portion of the body along opposite sides of the open top, a shiftable roof disposed across the open top of the body, said roof having load bearing rollers journalled along opposite sides thereof and tracked within said channel-shaped tracking rails, said load bearing rollers being free to track longitudinally, thereby supporting the roof for lineal motion to an open or closed position relative to the open top with the roof partially extending beyond the vehicle body in cantilever fashion in said open position, fulcrum rollers rotatably journalled at an end of the body, said rollers providing a fulcrum support for the overhanging portion of the roof, with the opposite portion of the roof confined downwardly by the engagement of said load bearing rollers within the channel-shaped tracking rails, an inflatable sealing tube interposed between the surfaces of the tracking rails and roof along opposite sides of the open top, and means for supplying fluid pressure to said tube, said tube lifting the weight load of the roof from said load bearing rollers upon being inflated with the roof closed, said tube forcing the load bearing rollers upwardly against the channel-shaped rails in which they are tracked and providing a weather seal between the roof and body along opposite sides of the open top.

References Cited in the file of this patent

UNITED STATES PATENTS

| | | |
|---|---|---|
| 1,099,361 | Hartland | June 9, 1914 |
| 1,417,573 | Salata | May 30, 1922 |
| 1,610,466 | Oversmith | Dec. 14, 1926 |
| 2,757,043 | Strick et al. | July 31, 1956 |